(12) United States Patent
Lindener et al.

(10) Patent No.: US 11,906,050 B2
(45) Date of Patent: Feb. 20, 2024

(54) RADIAL SHAFT SEALING RING

(71) Applicant: BRUSS SEALING SYSTEMS GMBH, Hoisdorf (DE)

(72) Inventors: Bjoern Lindener, Luebeck (DE); Juergen Grundt, Neumuenster (DE); Tobias Saberniak, Luebeck (DE); Manfred Brand, Tremsbuettel (DE)

(73) Assignee: BRUSS SEALING SYSTEMS GMBH, Hoisdorf (DE)

( * ) Notice: Subject to any disclaimer, the term of this patent is extended or adjusted under 35 U.S.C. 154(b) by 0 days.

(21) Appl. No.: 17/734,421

(22) Filed: May 2, 2022

(65) Prior Publication Data
US 2022/0349477 A1    Nov. 3, 2022

(30) Foreign Application Priority Data

May 3, 2021 (DE) .......................... 102021111404.7
Feb. 24, 2022 (DE) .......................... 102022104415.7

(51) Int. Cl.
*F16J 15/3284* (2016.01)
*H01B 1/22* (2006.01)

(52) U.S. Cl.
CPC ............ *F16J 15/3284* (2013.01); *H01B 1/22* (2013.01)

(58) Field of Classification Search
CPC .. F16J 15/3204; F16J 15/3216; F16J 15/3248; F16J 15/3252; F16J 15/3276; F16J 15/3284; H01B 1/22
See application file for complete search history.

(56) References Cited

U.S. PATENT DOCUMENTS

| | | | |
|---|---|---|---|
| 10,883,029 | B2 | 1/2021 | Traber et al. |
| 2003/0031828 | A1* | 2/2003 | Kosty .................. F16J 15/3252 428/156 |
| 2006/0290070 | A1 | 12/2006 | Park |
| 2014/0203514 | A1 | 7/2014 | Colineau et al. |
| 2016/0010750 | A1 | 1/2016 | Colineau et al. |
| 2018/0274682 | A1* | 9/2018 | Shimizu ............... F16J 15/3212 |
| 2018/0313449 | A1 | 11/2018 | Dahlhaus-Preussler et al. |
| 2020/0103029 | A1* | 4/2020 | Hintenlang .......... F16J 15/3228 |

FOREIGN PATENT DOCUMENTS

| | | |
|---|---|---|
| DE | 10 2013 000 982 A1 | 7/2014 |
| DE | 10 2013 000 982 B4 | 10/2015 |
| DE | 10 2014 014 392 A1 | 4/2016 |

(Continued)

OTHER PUBLICATIONS

First Examination Report issued by the German Patent and Trademark Office with respect to the German priority application No. 10 2021 111 404.7.

*Primary Examiner* — Gilbert Y Lee
(74) *Attorney, Agent, or Firm* — SALIWANCHIK, LLOYD & EISENSCHENK

(57) ABSTRACT

A radial shaft sealing ring is designed to electrically conductively connect a shaft to a component which is stationary relative to the shaft. The radial shaft sealing ring has a supporting body and a sealing element attached thereto having a sealing portion which makes contact with the shaft. The material composition of the sealing element and/or a protective lip comprises at least one base material made from at least one polymer and one or more fillers, with at least one electrically conductive filler being provided.

23 Claims, 11 Drawing Sheets

(56) References Cited

FOREIGN PATENT DOCUMENTS

| | | | |
|---|---|---|---|
| DE | 10 2017 004 061 A1 | | 10/2018 |
| DE | 102018104753 A1 | * | 9/2019 |
| DE | 10 2014 010 269 B4 | | 6/2020 |
| DE | 10 2019 217 072 A1 | | 5/2021 |
| JP | 2004 76798 A | | 3/2004 |
| JP | 2009 250348 A | | 10/2009 |
| JP | 2012 097827 A | | 5/2012 |
| KR | 20030064756 A | * | 8/2003 |
| WO | WO-2022024566 A1 | * | 2/2022 |

* cited by examiner

RADIAL SHAFT SEALING RING

CROSS-REFERENCE TO A RELATED APPLICATION

This application claims priority under 35 U.S.C. § 119(e) of German Patent Application No. DE 10 2021 111 404.7, filed on May 3, 2021; and German Patent Application No. DE 10 2022 104 415.7, filed Feb. 24, 2022, which are incorporated herein by reference in their entirety.

FIELD OF THE INVENTION

The present invention relates to a radial shaft sealing ring, wherein the radial shaft sealing ring is designed to electrically conductively connect a shaft to a component which is stationary relative to the shaft, the radial shaft sealing ring having a supporting body and a sealing element attached thereto having a sealing portion which makes contact with the shaft.

BACKGROUND OF THE INVENTION

Radial shaft sealing rings are generally known for sealing an interface between a rotating shaft and stationary parts, such as housing parts. Various designs are known in the prior art that enable a fluid and/or dirt exclusion function in various forms. Such radial shaft sealing rings are also used for sealing rotor shafts in electric motors or generators. A seal on an electric drive is required where a fluid, such as transmission oil, is used for cooling and/or lubricating inside the electric motor compartment.

The seal can provide sealing with respect to other spaces or the atmosphere.

Under certain circumstances, the rotors in electric motors can become statically charged, so that there is an electrical potential between the rotor shaft and the housing parts and possibly also relative to the stator of the electric motor, which can suddenly discharge. Such discharges can lead to damage in the electronics but also in the bearings supporting the rotor shaft. Accordingly, in order to avoid such discharges, electrical contact must be provided between the rotor shaft and a stationary part of the electric motor or generator, such as a housing, for reducing static electricity or preventing the build-up of static electricity.

DE 10 2013 000 982 A1 discloses a sealing ring made of an electrically conductive, rubber-elastic material which enables electrical contact to be made with the sealed-off rotor shaft.

DE 10 2014 010 269 B4 discloses a sealing ring having what is known as a buffer seal, in addition to a shaft seal which is not electrically conductive.

The shaft seal here assumes the sealing function, while the buffer seal is electrically conductive and makes electrical contact with the rotor shaft, and so the shaft seal and buffer seal are each optimised for different functions.

BRIEF SUMMARY OF THE INVENTION

The object underlying the invention is to specify a radial shaft sealing ring which enables a good sealing function and sufficient electrical contact with a shaft, while having a long service life.

To achieve the object of the invention, a radial shaft sealing ring having the features of claim 1 is proposed. Further preferred embodiments can be found in the dependent claims. According to the invention, the material composition of the sealing element comprises at least one base material made from at least one polymer, in particular a homopolymer and/or copolymer, and one or more fillers, with at least one electrically conductive filler being provided.

To achieve the object of the invention, a radial shaft sealing ring having the features of claim 2 is proposed as an alternative. Accordingly, the radial shaft sealing ring has a protective lip which is attached to the supporting body and in contact with the shaft, the material composition of the protective lip comprising at least one base material made of at least one polymer and one or more fillers, with at least one electrically conductive filler being provided.

It is possible that only the (primary) sealing element is electrically conductive, that only the (secondary) protective lip is electrically conductive, or that both the primary sealing element and the protective lip are electrically conductive.

When the electrically conductive filler is discussed below, the term refers to the filler of the sealing element and/or the filler of the protective lip. When the base material is discussed below, the term refers to the base material of the sealing element and/or the base material of the protective lip.

The base material is or preferably comprises at least one fluoropolymer such as PTFE, FKM, an elastomer, fluorinated thermoplastic or a PTFE-based polymer or a corresponding copolymer. Polytetrafluoroethylene (PTFE) is a plastic with good sliding properties and high mechanical and chemical resistance. The proportion by weight of the base material is preferably in the range between 50% and 99%, more preferably in the range between 70% and 90%, even more preferably in the range between 80% and 85%. The sealing element can also contain several different PTFE compounds, for example. This can be pure PTFE (homopolymer) or modified PTFE, in which another monomer is polymerised in addition to the TFE (copolymer).

The electrically conductive filler preferably has metal, metallised and/or metal-coated particles, microspheres, microtubes and/or fibres in order to be able to set the conductivity of the sealing element as desired. The proportion by weight of the one or more electrically conductive fillers, or of all of them, is preferably in the range between 1% and 25%, more preferably in the range between 5% and 20%, even more preferably in the range between 10% and 15%.

In an advantageous embodiment, this is silver, i.e., the electrically conductive filler preferably has silver, silver-plated and/or silver-coated particles, microspheres, microtubes and/or fibres. It is further proposed that the metallisation of the particles, fibres, etc. mainly comprises silver (Ag), i.e. with at least a proportion by weight of 50% silver as the metal used for the metallisation.

Metallised particles, fibres, etc. are particles or fibres, etc. which have a metal coating on their surface. Accordingly, metallised particles, fibres, etc. have metallic properties on their outer shell, such that they are electrically conductive when combined. Other properties such as strength and/or density, on the other hand, are mainly defined by the inner material of the particles, fibres, etc.

The introduction of electrically conductive filler into the base material of the sealing element makes it possible to achieve sufficient conductivity without significantly reducing the properties of the base material with regard to tribological properties, temperature resistance, and mechanical properties such as strength. Accordingly, a good sealing effect can be achieved together with a long service life. Due to the electrical conductivity of the sealing element, there is no need for an additional buffer seal, which simplifies the design, reduces costs, and reduces the friction losses of the seal overall.

Electrically conductive carbon, for example in powder or pigment form, has proven to be a preferred filler. The proportion by weight of the electrically conductive carbon is preferably in the range between 1% and 15% and/or is preferably at least 4%, more preferably at least 7%, even more preferably at least 10%. Conductive carbon is inexpensive and makes it possible to set the desired conductivity of the sealing element easily and precisely. Additionally or alternatively, electrically conductive carbon fibres can be considered for use as a filler.

A preferred filler consists of fibres, in particular glass fibres, to reduce wear. The proportion by weight of glass fibres is preferably in the range between 5% and 20%, preferably in the range between 6% and 15%, more preferably in the range between 7% and 12%, for example in the range between 8% and 10%. The proportion by weight of the at least one fibre filler, or of all fibre fillers, is preferably in the range between 1% and 30%, more preferably in the range between 5% and 20%, even more preferably in the range between 7.5% and 15% and is for example 10%. Fibre fillers are primarily used to mechanically reinforce the sealing element.

In some embodiments of the invention, at least one filler consists of a metal oxide or a mixture of metal oxides. A filler made of tin(IV) oxide, indium tin oxide or a mixture thereof has proven to be particularly suitable. The proportion by weight of the one or more metal-oxide-containing fillers, or of all of them, is preferably in the range between 0.5% and 10%, more preferably in the range between 1% and 5%. Another preferred filler is dendritic silver. The proportion by weight of the dendritic silver filler is preferably in the range of 1% to 10% and more preferably in the range of 1% to 5%.

A filler can consist of silver-coated glass fibres. Silver-coated glass fibres enable the sealing element to have comparatively good tribological properties. The filler made of silver-coated glass fibres can have a proportion of silver from 8 to 20 percent by weight. The proportion of silver in the filler made of silver-coated glass fibres can be 12 percent by weight, for example. Such a proportion of silver allows for a good compromise between conductivity and costs. The silver-coated glass fibres in the filler can have an average fibre length of 100 to 160 μm. The average fibre length can be 130 μm, for example. Short fibre lengths allow various standard production methods to be used. At the same time, a satisfactory surface quality can be achieved in the proposed range of the average fibre length.

A filler can consist of silver-coated, advantageously solid glass spheres. In possible alternative embodiments, hollow glass spheres can also be used.

The use of silver-coated glass spheres as a filler makes it possible to use standard production methods for the radial shaft sealing ring without major adjustments. The filler made of silver-coated glass spheres can have a proportion of silver of 4 to 20, preferably 4 to 12 percent by weight. The proportion of silver can be 12 percent by weight, for example. By using silver-coated glass spheres, the utilisation rate of the silver in the filler in relation to the filler volume can be utilised particularly efficiently. The silver-coated glass spheres can have an average diameter of 10 to 45 μm, preferably 10 to 30 μm. The average diameter of the glass spheres can be 14 μm, for example. These diameters are particularly suitable for keeping mechanical stress peaks in the material low and avoiding the formation of cracks under alternating loads.

A filler can consist of silver-coated copper particles. The combination of a very conductive coating of silver on copper particles, which also have a very high conductivity, significantly increases the conductivity of the filler. In this way, the conductivity of the radial shaft sealing ring and consequently its effect on dissipating static electrical voltages can be increased. The silver-coated copper particles can have a dendritic structure to achieve high electrical conductivity between the respective silver-coated copper particles in the filler, as the dendritic structure achieves a high degree of branching in the sealing element. The filler made of silver-coated copper particles can have a proportion of silver of 9 to 19 percent by weight. This makes it possible to largely coat in particular dendritic copper particles in their entirety. The silver-coated copper particles in the filler can have an average diameter of 30 up to 55 μm. A good compromise can thus be reached between the mass of the individual copper particles and the mass of the silver coating as well as the conductivity in the sealing element.

A filler can consist of silver-coated nickel particles. Silver-coated nickel particles, similar to silver-coated copper particles, can result in high conductivities in the sealing element. In addition, the silver-coated nickel particles can be magnetically aligned during the manufacturing process, for example, to align the mechanical properties of the sealing element in a preferred direction.

The filler made of silver-coated nickel particles can have a proportion of silver of 8 to 40 percent by weight. The proportion of silver can be, for example, 8 percent by weight or, for example, 18 percent by weight. The silver-coated nickel particles can have an average diameter of 8 to 32 μm. The average diameter of the particles can be 31 μm, for example. Thus, a good compromise can be achieved between the mass of the individual nickel particles and the mass of the silver coating as well as the conductivity in the sealing element.

A filler can consist of silver-coated glass powder. As a result, a particularly fine distribution of the conductive filler can be achieved. Conventional manufacturing methods can thus be used without major adjustments. At the same time, mechanical stress peaks in the material of the sealing element at the boundary to the filler are avoided due to the particularly small particle size of the silver-coated glass powder. The filler made of silver-coated glass powder can have a proportion of silver of 3 to 8 percent by weight. In addition to silver, the coating can have a proportion of zinc of 3 to 11 percent by weight. This makes it possible to achieve a cost-effective reduction in the amount of silver used. The glass powder particles can have an average diameter of 3 μm. This allows the above-mentioned advantages due to a small particle size with simultaneous practicable manageability of the filler.

The sealing element can have a mixture of a filler made of silver-coated glass fibres and a filler made of silver-coated glass spheres.

In advantageous embodiments, the sealing element and/or the protective lip is/are attached to the supporting body and/or to the contact ring, if present, via an adhesive. In some embodiments, the adhesive is electrically conductive. This can be achieved, for example, by using conductive particles or fibres in an adhesive base material. If a conductive adhesive is provided between the sealing element or the protective lip and the supporting element, a contact ring is not required. The adhesive between the sealing element or the protective lip and the supporting body can also be non-conductive; in this case, a conductive contact ring (see below) is advantageously used to achieve the electrical attachment to the stationary component. The adhesive can be a vulcanisable rubber compound which is applied as a non-vulcanised strip and cross-links under the application of temperature during compression. Other adhesives, for example based on epoxy resin, are conceivable. Additionally or alternatively, other types of attachment are possible. For example, the sealing element and/or the protective lip can be fastened to the supporting body by means of metal rivets.

In preferred embodiments, the radial shaft sealing ring comprises a preferably electrically conductive, in particular metal contact ring for making electrical contact with the sealing element and/or the protective lip. The contact ring makes contact with the sealing element or the protective lip and thus ensures the electrical attachment of the sealing element or the protective lip to the stationary component, in particular in the event that any adhesive used between the sealing element/protective lip and the supporting body is not sufficiently conductive. To improve the electrical contact, the contact ring preferably has at least one electrically conductive penetrating element, which penetrates into the sealing element and/or into the protective lip in the installed state. If the sealing element or the protective lip is attached to the contact ring in an electrically conductive manner, an electrically conductive adhesive is not required. In this case, the sealing element or the protective lip is conductively connected to the outer flange of the supporting element and/or to the stationary component/housing via the contact ring.

Additionally or alternatively, the supporting body can have at least one electrically conductive, protruding penetrating part, which penetrates into the sealing element and/or into the protective lip in the installed state. In further embodiments, the supporting body has, on its inner circumference, at least one electrically conductive extension which, in the installed state, makes contact with the sealing element and/or the protective lip, in particular in a transition portion between an attachment portion and a contact portion of the sealing element or the protective lip. This can also improve the electrical contact between the sealing element/protective lip and the supporting body. Another way to improve contact is to metallise the PTFE compound surface by means of galvanic or metal (vapour/atomic) deposition processes.

For particularly high demands on the sealing function, an additional sealing lip made of a conventional, for example non-conductive, material can be provided in possible embodiments.

In a further advantageous embodiment, the sealing element and/or the protective lip has an electrically conductive surface coating in addition or as an alternative to a preferred electrical conductivity of a corresponding main body of the sealing element and/or the protective lip. A significant increase in the electrical conductivity of the radial shaft sealing ring can be achieved in this manner.

This can preferably be a metal coating, for example based on copper, silver, gold, tin, aluminium or other metals or alloys. It is also possible to combine multiple metal layers. In addition, metals or semiconductors can be combined with conductive non-metal components.

The coating can be based on non-metal conductive materials such as graphene, graphite, carbon nanoparticles, carbon fibres, conductive carbon black or conductive polymers such as polyaniline or its derivatives, in particular without a cohesive matrix. In addition, metals can also be incorporated into these layers, for example metallised graphite.

The coating can be made conductive by metal components that are integrated in a matrix, for example conductive lacquers with metal fillers such as copper, silver, gold, tin, or other metals or their alloys. The coating can be made conductive by means of non-metal conductive components that are integrated in a matrix, for example conductive lacquers with non-metal fillers such as graphene, carbon nanoparticles, carbon fibres, or conductive carbon black. A conductive polymer, such as polyaniline or its derivatives, can serve as a matrix for the aforementioned fillers; the use of non-conductive polymers or resins is also possible.

The coating can comprise a combination of metal and non-metal conductive components, for example a combination of copper and graphene or copper and polyaniline, advantageously also as protection against corrosion of the copper.

Conductive particles are preferably deposited or applied to a main body of the sealing element and/or the protective lip by chemical, galvanic or physical methods, for example PVD, CVD, ultrasound, jetting and the like. The surface of the sealing element and/or the protective lip can be provided with the conductive coating completely or partially, in particular on one side, both sides, or in partial regions of one or both surfaces.

Depending on which metal is used for the coating, it is possible for the metal to be transferred from the surface of the sealing element and/or the protective lip to the metal surface on the mating surface of the shaft, which enables a reduction of the transition resistance under dynamic conditions with low radial forces. The layer thickness of the electrically conductive layer is preferably in the range between one atomic layer and a maximum of 0.3 mm.

The invention will be explained below on the basis of preferred embodiments with reference to the attached drawings, in which:

DETAILED DESCRIPTION OF THE INVENTION

Figure 1:
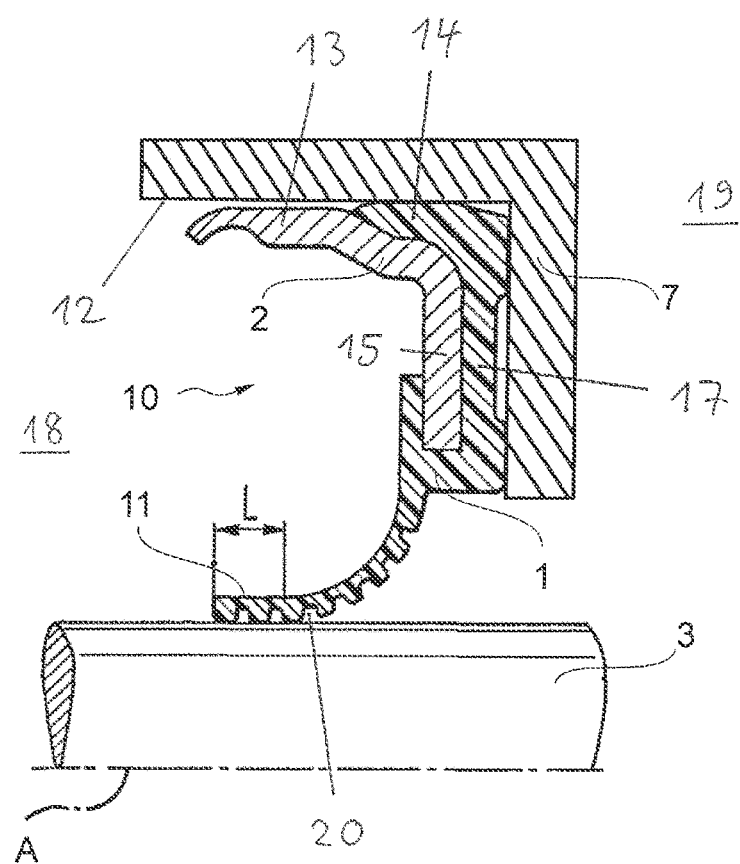
FIG. 1-6 are cross-sectional views of an installed radial shaft sealing ring in different embodiments.

The radial shaft sealing ring 10 comprises a supporting body and a sealing element 1 fastened or attached to the supporting body 2. The supporting body 2, which e.g. is made of metal, can be inserted into a cylindrical bore 12 of a component 7 which is stationary relative to the rotor shaft 3, for example the housing of an electric motor, and for this purpose has a cylindrical flange 13 on its outer circumference, the outer diameter of which flange corresponds to the inner diameter of the cylindrical bore 12. Furthermore, the radial shaft sealing ring 10 has, on its outer circumference, a static seal 14 which is oversized relative to the inner circumference 12 of the stationary component 7 and thus seals the installed radial shaft sealing ring 10 off from the component V. As shown here, the static seal 14 can be formed integrally with the sealing element 1 or can be a separate component made of the same material as the sealing element 1 or a different material. The supporting body 2 also has a radial supporting portion 15 which, starting from the cylindrical flange 13, extends radially inwards and serves to hold the sealing element attached thereto.

In the uninstalled state, the sealing element 1 has the shape of an annular disc, for example. The sealing element 1 has an outer radial attachment portion 17 by means of which the sealing element 1 is connected in a planar and electrically conductive manner to the supporting body 2 or to the supporting portion 15. The sealing element also has an inner cylindrical contact portion 11 which, in the installed state, preferably lies flat on a shaft 3 with an axial length L and thus preferably makes planar contact with it, as can be seen in FIG. 1. Planar contact is not absolutely necessary; it is basically sufficient if the sealing element 1 rests on the shaft 3 with only one edge. In the installed operating state, the sealing element 1 with the contact portion 11 is preferably curved inwards relative to the interior space 20, as shown in FIG. 1. The sealing element 1 can alternatively be curved outwards. The (primary) sealing element 1 can also be referred to as a sealing lip.

The sealing element 1 is electrically conductive. Due to the electrically conductive contact between the electrically conductive sealing element 1 and the shaft 3, the electrical attachment of the sealing element 1 to the metal supporting body 2 and the electrically conductive contact between the supporting body 2 and the e.g. metal component 7, there is a continuous electrically conductive connection between the shaft 3 and the component 7. In this manner, the radial shaft sealing ring 10 establishes equipotential bonding between the shaft 3 and the component 7 in every operating state of the electric motor.

In the installed state, the radial shaft sealing ring 10 seals an interior space 18 of the component 7 off from an exterior space 19 by means of the sealing element 1 (seal with respect to the shaft 3) and the static seal 14 (seal with respect to the component 7). On the side facing the shaft 3, the sealing element 1 can have a structure in the form of one or more grooves 20, for example a spiral groove or annular grooves, which serve to return particles from the outside to the inside (towards the interior space 18).

The radial shaft sealing ring 10 can have a dirt lip 16, in particular towards the exterior space 19, which makes contact with the shaft or, as shown in FIGS. 2 to 6, does not make contact with the shaft, but this is not necessarily the case. The dirt lip 16 can be manufactured integrally or in one piece with the static seal 14 and/or with the sealing element 1 from the same material and/or in the same work step. The dirt lip 16 may also be referred to as a secondary lip protective lip, or dust protection lip.

The material of the sealing element 1 comprises a base material, which has the largest proportion by weight in the material of the sealing element 1, and one or more fillers with a lower proportion by weight, with at least one of the fillers being an electrically conductive filler distributed in the base material. The base material is advantageously PTFE (polytetrafluoroethylene) or another fluoropolymer such as FKM (fluororubber), a simple elastomer such as ACM, AEM, HNBR or NBR, or fluorinated thermoplastic. The at least one electrically conductive filler preferably comprises metal, metallised and/or metal-coated particles, fibres and/or hollow spheres, conductive carbon black, nanotubes, in particular hollow fibre or carbon nanotubes, and/or conductive fibres, for example carbon fibres.

In a first embodiment, the material of the sealing element 1 has PTFE as its base material with a proportion by weight of between 75% and 90%, conductive carbon with a proportion by weight of between 1% and 10%, for example 5%, and a fibre filler material, in particular carbon fibres and/or glass fibres, with a proportion by weight of between 5% and 20%. In addition, a further polymer filler, for example PEEK and/or PI, can be provided with a proportion by weight of between 1% and 10%, for example 5%.

In a second embodiment, the material of the sealing element 1 has PTFE as its base material with a proportion by weight of between 75% and 90%, preferably between 80% and 85%, conductive carbon material with a proportion by weight of between 5% and 10%, for example, 7%, and a fibre filler, in particular carbon fibres and/or glass fibres, for example glass fibres, with a proportion by weight of between 5% and 15%, for example 10%. In addition, a metallised, in particular silver-plated filler, such as dendritic silver, tin(IV) oxide, also doped, indium tin oxide, or a mixture thereof, with a proportion by weight of between 1% and 5%, for example 2%, and/or another polymer filler, for example PEEK and/or PI, with a proportion by weight of between 1% and 5%, for example 2%, may be provided.

In a third embodiment, the material of the sealing element 1 has PTFE as its base material with a proportion by weight of between 65% and 85%, preferably between 70% and 80%, for example 75%, and a metallised, in particular silver-plated filler with a proportion by weight of between 15% and 35%, preferably between 20% and 30%, for example 25%, for example silver-plated copper particles, silver-plated glass fibres, silver-plated micro-glass spheres and/or silver-plated amorphous glass powder.

Various solutions are possible for the conductive attachment of the sealing element 1 to the supporting body 2.

Figure 2:
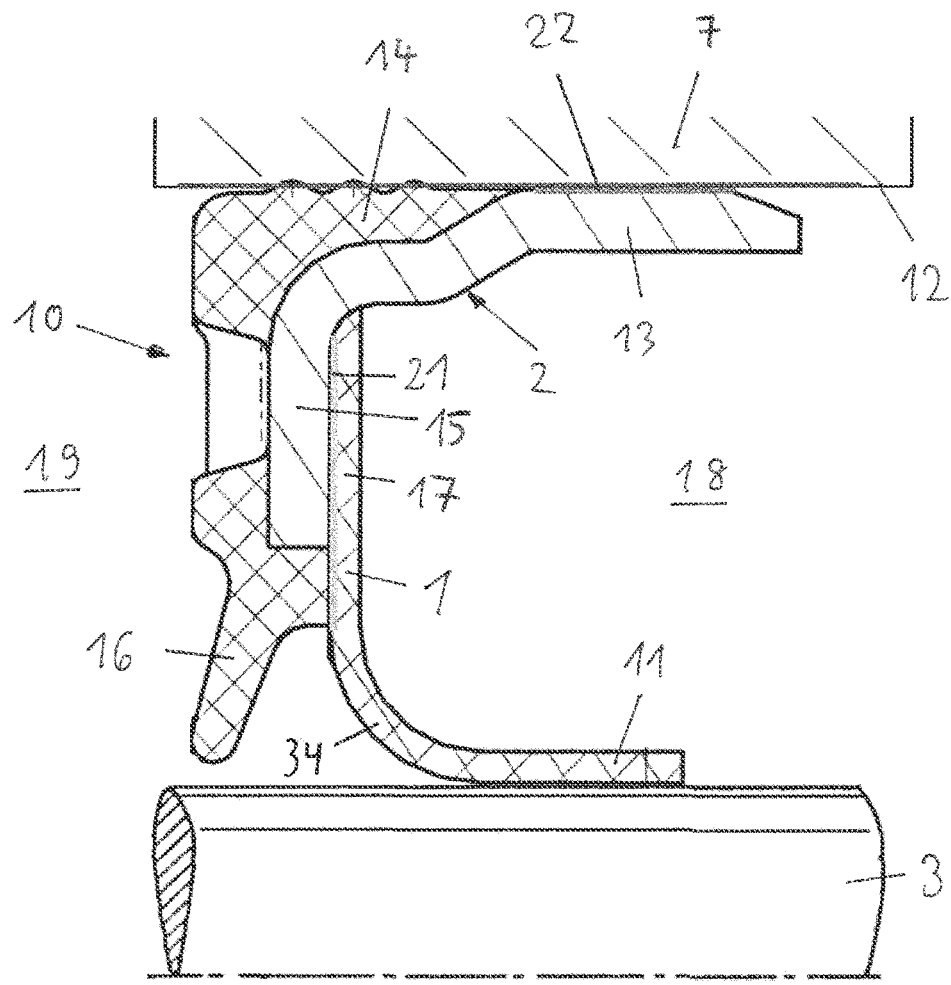

In the embodiment according to FIG. 2, the sealing element 1 is attached to the supporting body 2 via a conductive adhesive 21 which is preferably applied in a planar manner between the supporting portion 15 and the attachment portion 17. The adhesive 21 can be, for example, a conductive elastomer mixture or a conductive adhesive tape. Conductive epoxy resin or thermoset adhesive 21 is also conceivable, as is any known and suitable adhesive. The adhesive 21 between the supporting portion 15 and the attachment portion 17 can also be additionally provided in the other embodiments.

In some embodiments, a binding agent (not shown) can be provided on the supporting body 2, made e.g. of steel, for binding to the for example elastomeric sealing element 1. In this case, the binding agent is preferably also conductive. In addition, or as an alternative, contact regions 22, i.e., regions without a binding agent, can be left bare on the surface of the supporting body, for example if the binding agent does not have sufficient conductivity.

Figure 3:
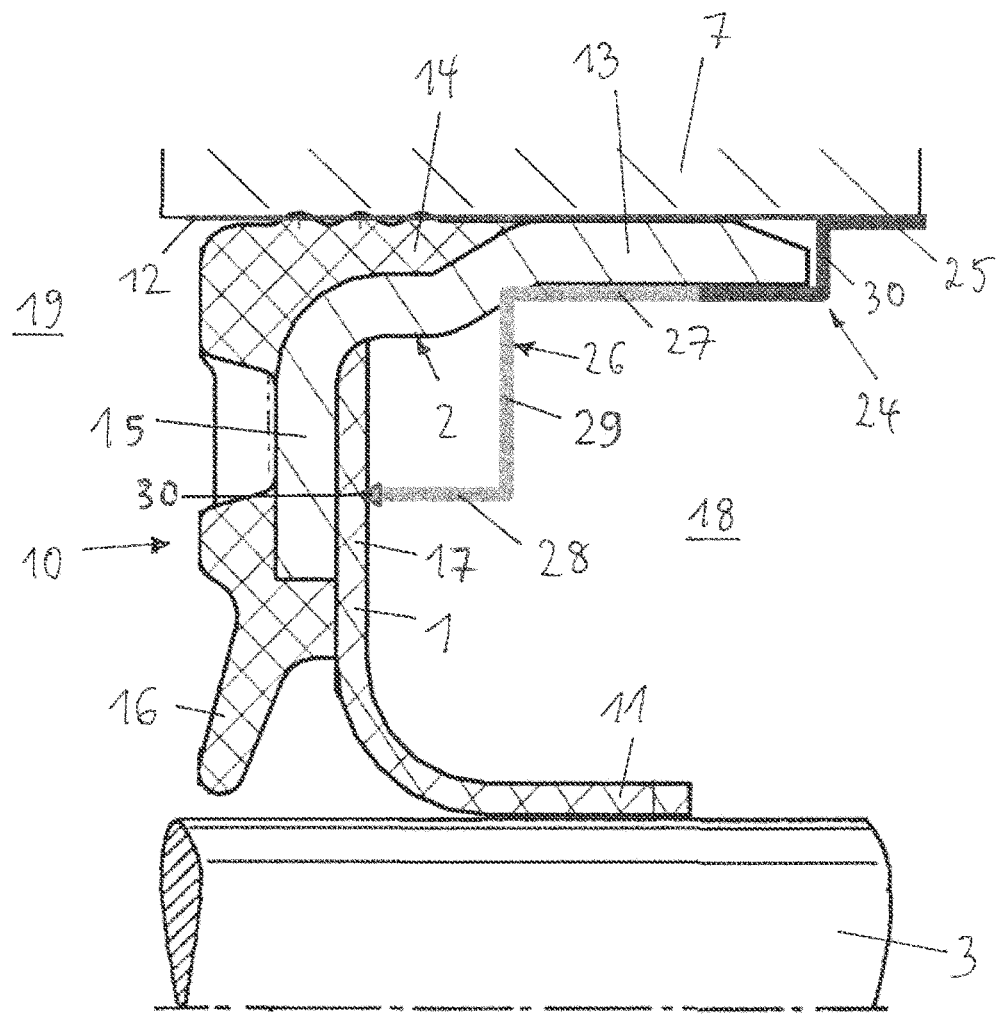
Figure 4:
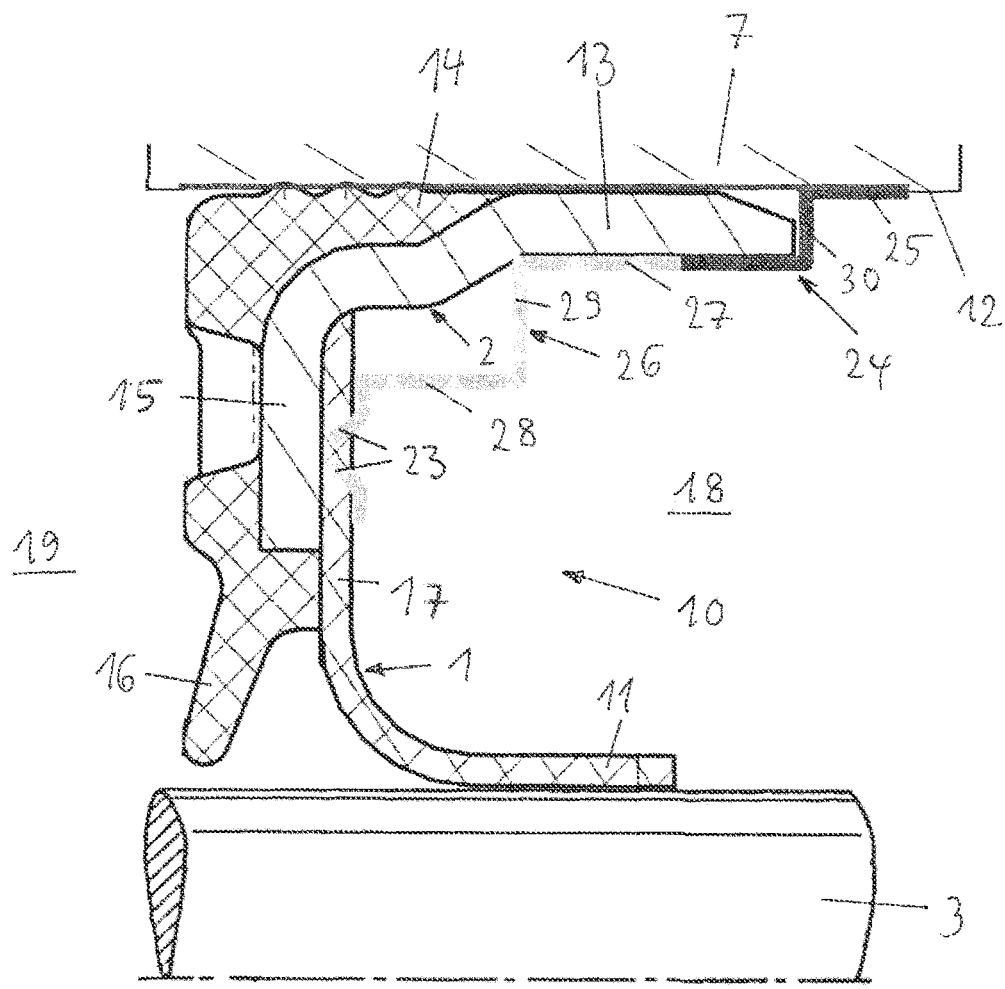

In the embodiment of FIGS. 3 and 4, the radial shaft sealing ring 10 has a contact ring 26 which is designed to fasten the sealing element 1 to the supporting body 2 in a clamping manner. The contact ring 26 advantageously has a cylindrical outer portion 27, a cylindrical inner portion 28 and a radial connecting portion 29 connecting the cylindrical outer portion 27 to the cylindrical inner portion 28. The outer diameter of the outer portion 27 advantageously corresponds to the inner diameter of the cylindrical flange 13 to enable clamping fastening of the contact ring 26 in the supporting body 2. The contact ring 26, in particular the cylindrical inner portion 28, in the installed state presses the sealing element 1, in particular the attachment portion 17, against the supporting body 2, in particular against the supporting portion 15. The sealing element 1 is clamped to the supporting body 2 in this manner. Additional bonding with adhesive 21 is possible.

The contact ring 26 is advantageously electrically conductive, for example made of metal, to contribute to the electrical connection between the sealing element 1 and the supporting body 2. To increase the electrical conductivity between the sealing element 1 and the supporting body 2, the contact ring 26 preferably has at least one electrically conductive penetrating element 30, in particular on the cylindrical inner portion 28. The penetrating element 30 can consist, for example, of a plurality of teeth arranged around the circumference of the contact ring 26. It is also possible that the penetrating element 30 is designed to be continuous around the circumference of the contact ring 26.

In the embodiment according to FIG. 4, a conductive, in particular metal contact ring 26 is provided as well, which has metal protruding penetrating parts 23 which penetrate into the sealing element 1, in particular into the attachment portion 17, when the radial shaft sealing ring 10 is in the installed state. The penetrating parts 23 can be in the form of sharp edges or wings which are bent up for example from a region of the contact ring 26 having one or more slots. Advantageously, a plurality of penetrating parts 23 are distributed over the circumference of the contact ring 26.

In the embodiments with a contact ring 26, a preferably metal contacting element 24 which conductively connects the contact ring 26 to the component 7 can also be provided. The contacting element 24 can advantageously be formed integrally with the contact ring 26. The advantageously circumferential contacting element 24 can have a cylindrical portion 25 for making contact with the component 7 in the region of the cylindrical bore 12 and a radial portion 30 for connecting the rest of the contact ring 26 to the cylindrical portion 25. In the case of an electrically conductive contacting element 24, the radial shaft sealing ring 10 can be provided with a seat 14 made entirely of non-conductive elastomer or rubber without direct contact between the supporting body 2 and the component 7.

Figure 5:
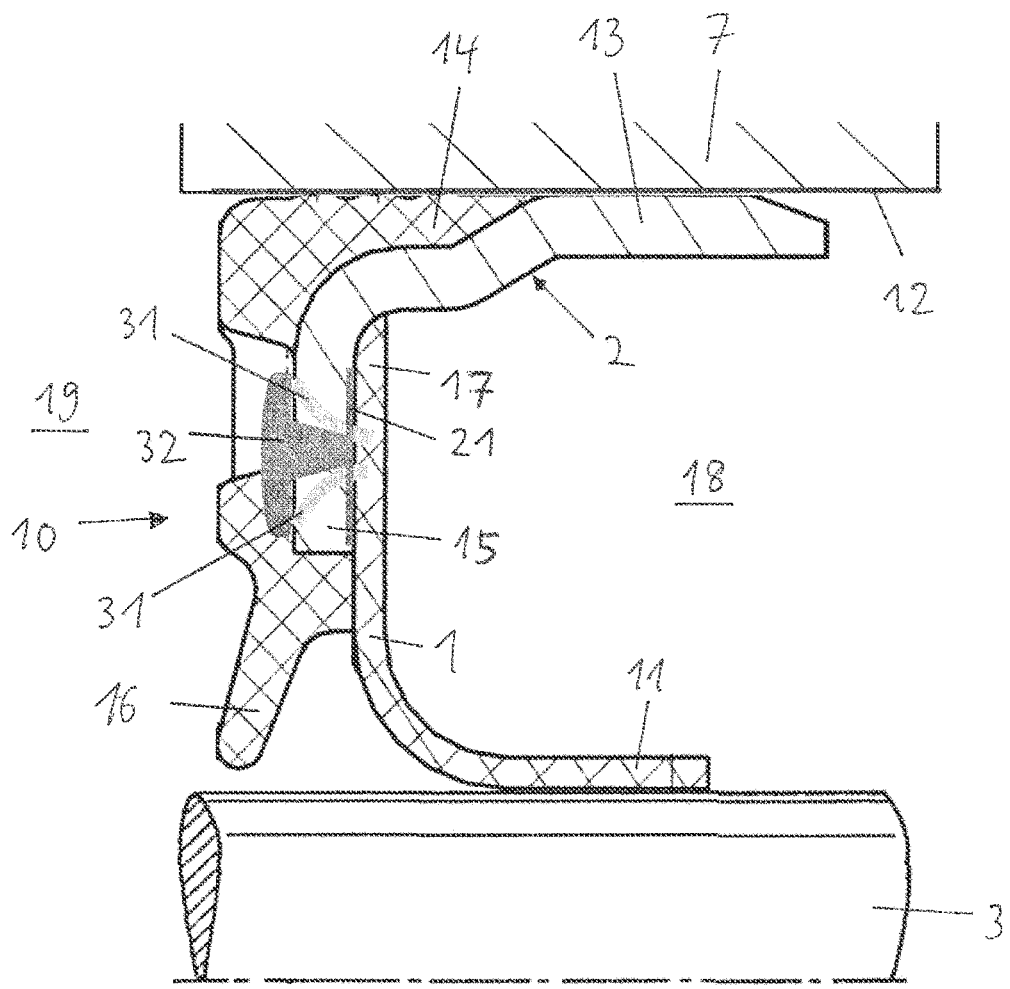

In the embodiment according to FIG. 5, metal, protruding penetrating parts 31 are also provided. In this embodiment, however, these are formed by the metal supporting body 2, in particular the supporting portion 15, and therefore penetrate from the other side—relative to the embodiments according to FIGS. 3 and 4—into the sealing element 1, in particular into the attachment portion 17. The penetrating parts 31 can be in the form of sharp edge parts or wings which are bent up for example from a region of the supporting body 2, in particular of the supporting portion 15, having one or more slots. Advantageously, a plurality of penetrating parts 31 are distributed across the circumference of the supporting body 2.

In the embodiment according to FIG. 5, the sealing element 1 can be injection or attached from the surrounding side 19 via the penetrating parts 31. An elastomer stopper 32 can then be formed on the surrounding side 19 due to the manufacturing process.

Figure 6:
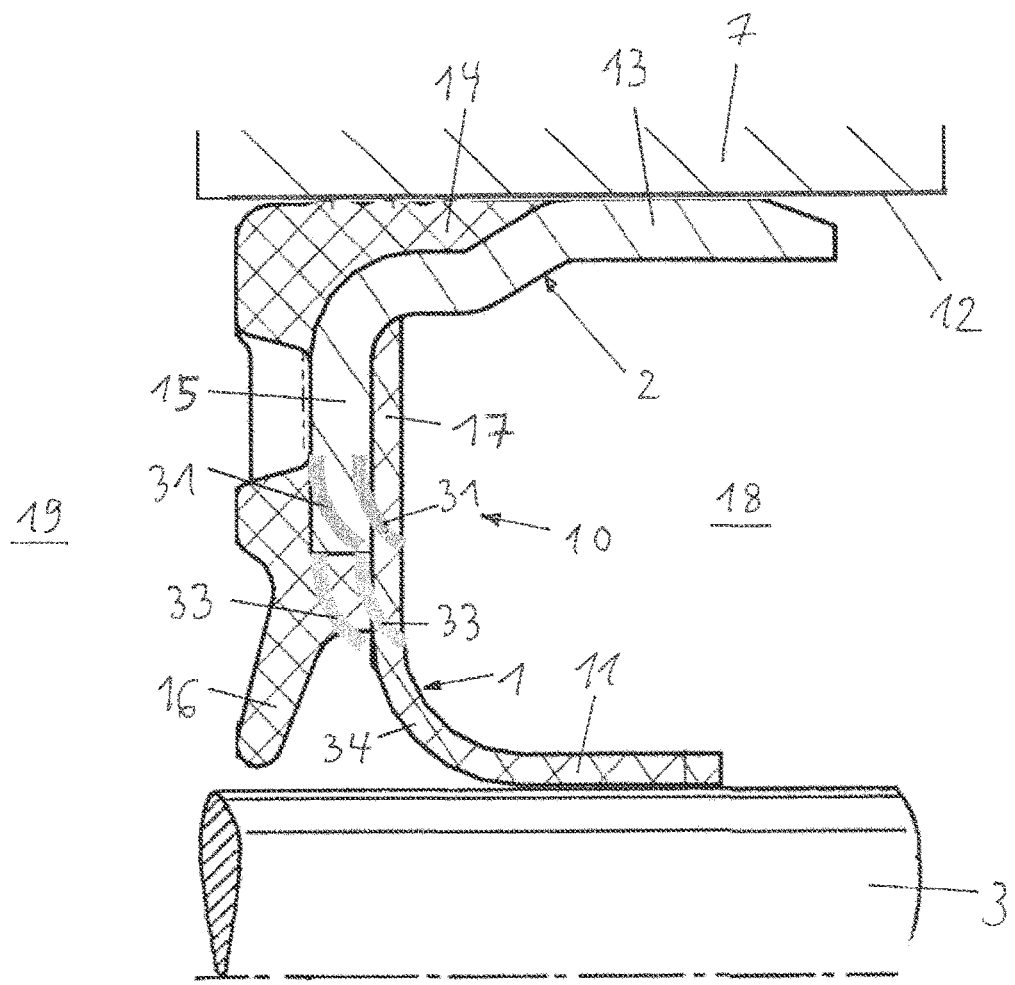
Figure 7:
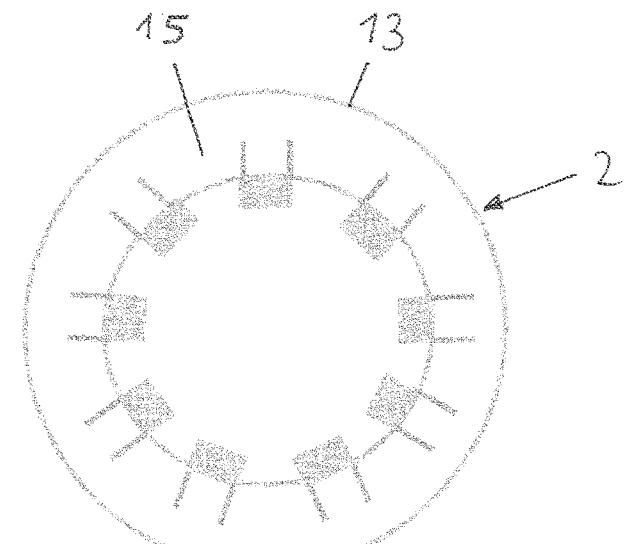
FIG. 7 is a schematic view of the supporting body of the radial shaft sealing ring according to FIG. 6.

In the embodiment according to FIGS. 6 and 7, metal extensions 33 are provided on the inner circumference of the supporting body 2 or the supporting portion 15, in particular in the form of tabs which support the sealing element 1 in a contact-making manner when the radial shaft sealing ring 10 is in the installed state, in particular in a curved transition portion 34 between the attachment portion 17 and the contact portion 11. In this embodiment, metal protruding penetrating parts 31 can additionally be provided, as described with reference to FIG. 5.

All of the described embodiments can optionally have a conductive adhesive 21 between the sealing element 1 and the supporting body 2, as described in connection with FIG. 2.

Figure 8:
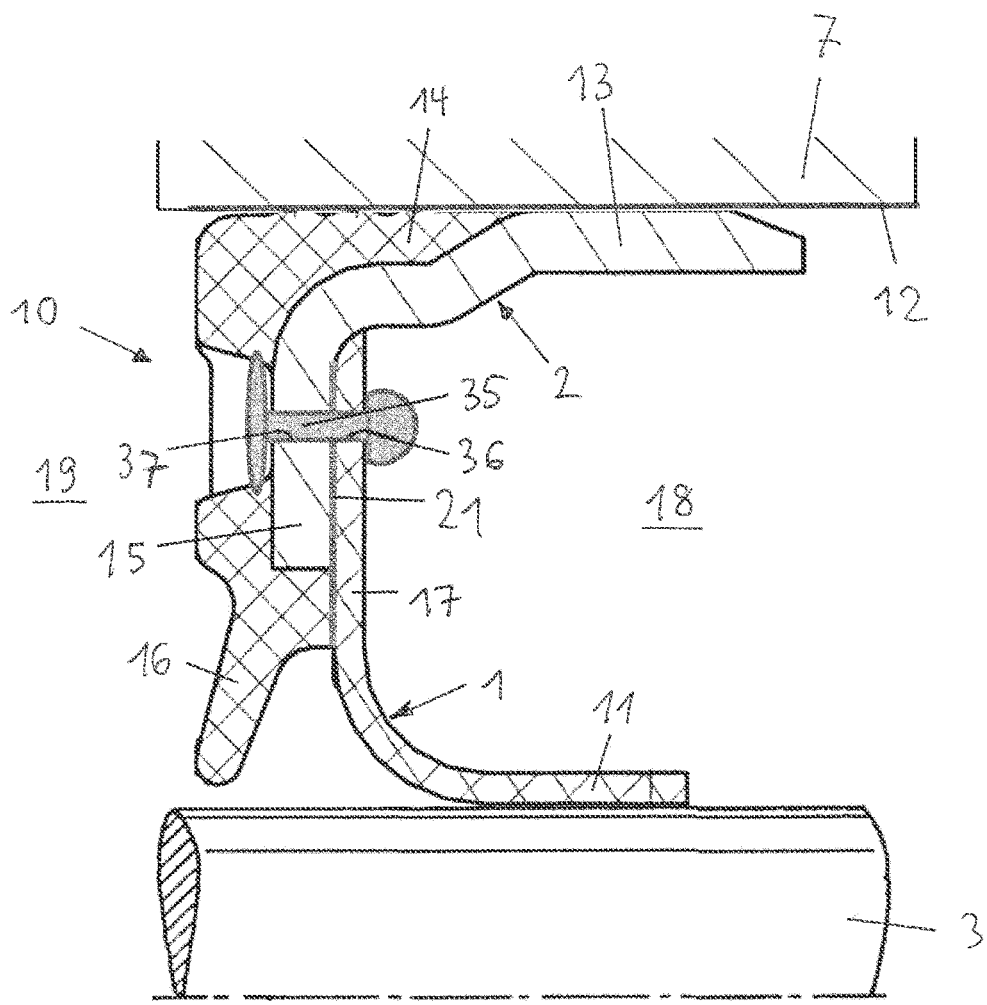
FIG. 8-12 are cross-sectional views of an installed radial shaft sealing ring in further embodiments.

In the embodiment according to FIG. 8, a plurality of metal rivets 35 are distributed across the circumference of the radial shaft sealing ring 10 and engage through a corresponding bore 36 in the sealing element 1, in particular in the attachment portion 17, and a corresponding bore 37 in the supporting body 2, in particular in the supporting portion 15, and thereby establish an electrically conductive riveted connection between the sealing element 1 and the supporting body 2. In this manner, the adhesive 21 or alternatively an elastomer attachment is electrically bridged.

Figure 9:
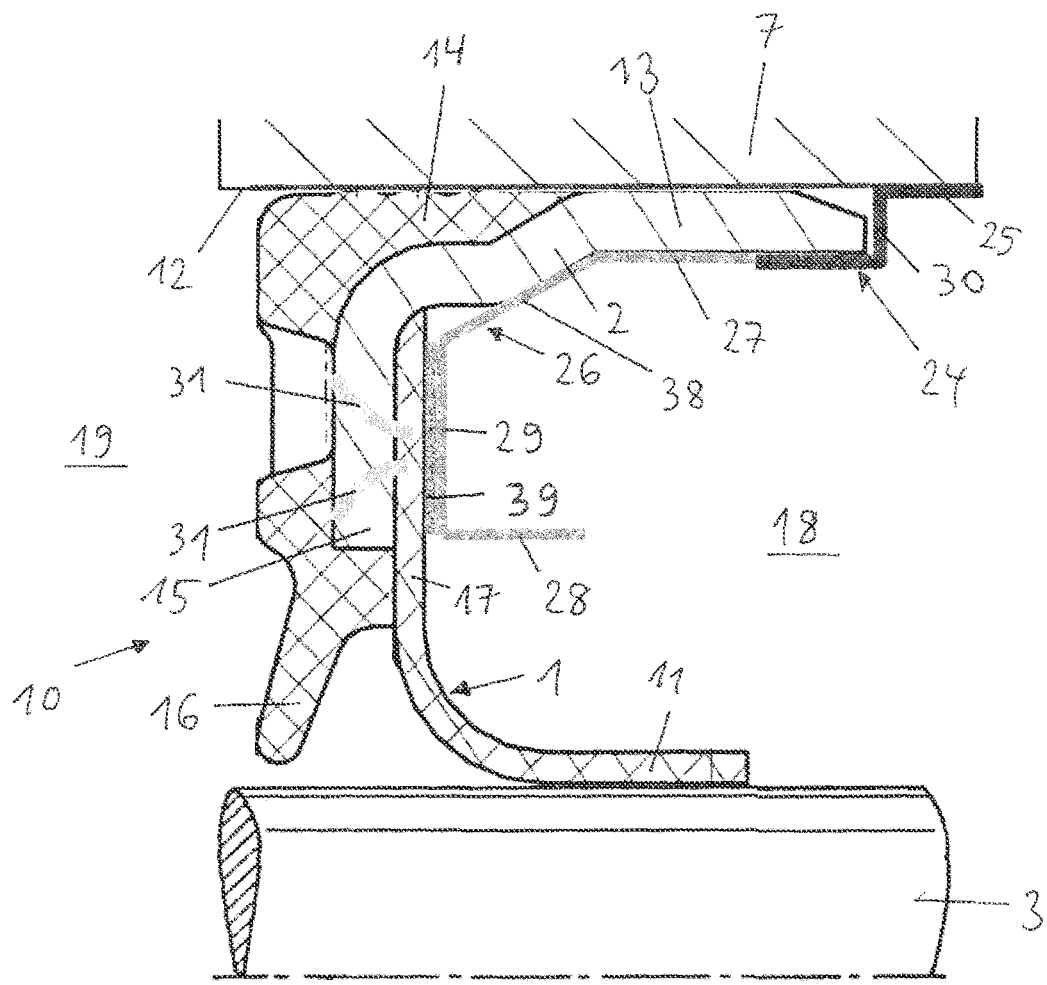

In the embodiment according to FIG. 9, a contact ring 26 is provided in turn, which in this embodiment is substantially U-shaped, for example. A bevelled leg 38 is also provided here between the cylindrical outer portion 27 and the radial connecting portion 29, but this is not absolutely necessary. In this embodiment, the contact ring 26 acts for example as a clamping ring for pressing the sealing element 1, in particular the attachment portion 17, against the supporting element 2, in particular the supporting portion 15, thus holding it securely. An adhesive 39 can be provided between the contact ring 26, in particular the radial portion 29, and the sealing element 1, in particular the attachment portion 17. This can be a non-conductive adhesive if there is an electrically conductive connection between the sealing element 1, in particular the attachment portion 17, and the supporting ring 2, in particular the supporting portion 15.

Figure 10:
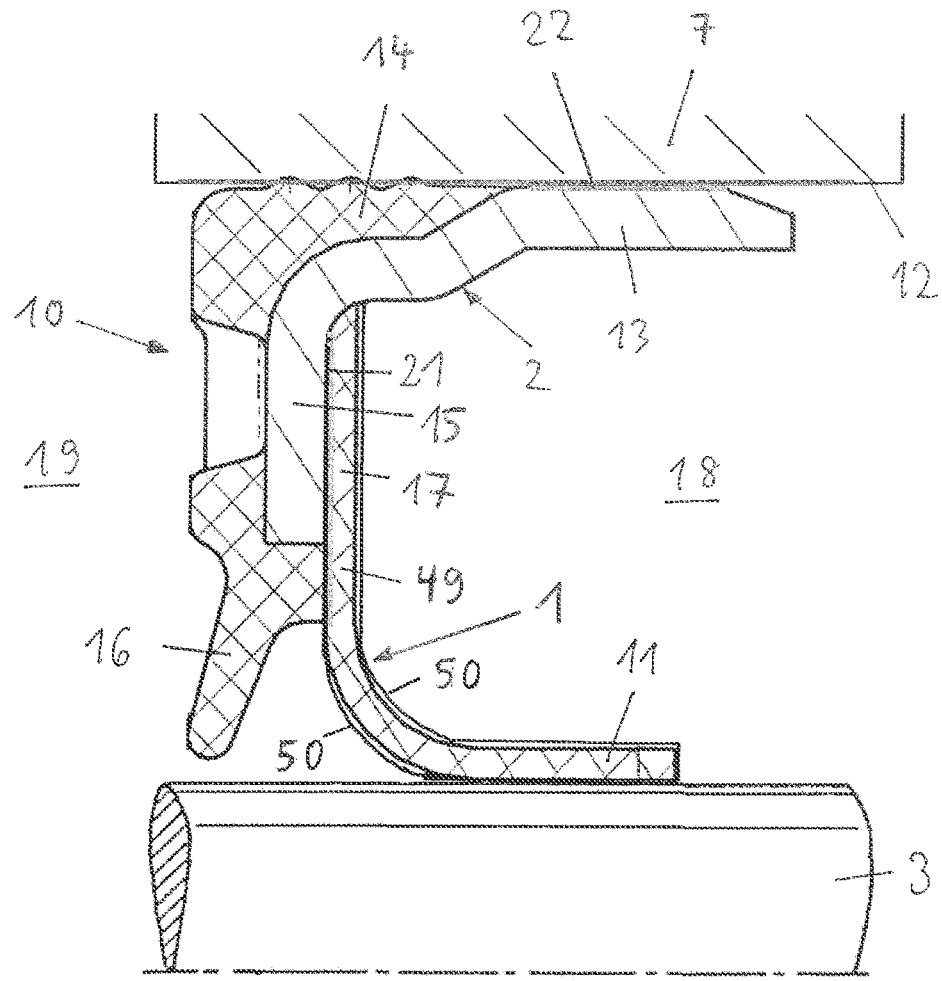

FIG. 10 shows a further advantageous embodiment in which the sealing element 1 has at least one electrically conductive coating 50 on the surface of its main body 49. The main body 49 can correspond to the sealing element 1 without a coating 50, as has been described above, in particular with reference to FIGS. 1 to 9. The main body 49 is preferably electrically conductive, such that reliable earthing is still ensured in the event of abrasion of the coating 50. The materials and layer thicknesses of the electrically conductive coating 50 are advantageously chosen as previously described.

The electrically conductive coating 50 can be applied on both sides, i.e., on the side facing the exterior space 19 and on the side of the sealing element 1 facing the interior space 18. The electrically conductive coating 50 can be applied on one side, i.e., only on the side facing the exterior space 21 or only on the side facing the interior space 20. The electrically conductive coatings 50 on the two sides of the sealing element 1 can differ from one another in terms of material, application pattern and/or layer thickness.

The electrically conductive coating 50 can be formed across the entire surface or partially on one or both sides of the sealing element 1. In the case of a partial coating 50, the main body 49 of the sealing element 1 has uncoated regions and coated regions, the number, shape, and arrangement of which can be suitably selected. Different coating types can be selected on both sides of the sealing element 1. Also possible is a full-surface electrically conductive coating 50 on one side and a partial electrically conductive coating 50 on the opposite side. A further embodiment has different partial electrically conductive coatings 50 on the same side of the sealing element 1. In a further embodiment, the sealing element 1 has a multi-layer electrically conductive coating 50 with multiple superimposed layers, of which one, multiple or all are electrically conductive.

In principle, all conceivable combinations of full-surface, partial, one-sided, two-sided, multi-layer, similar and/or different coatings 50 are possible.

Figure 11:
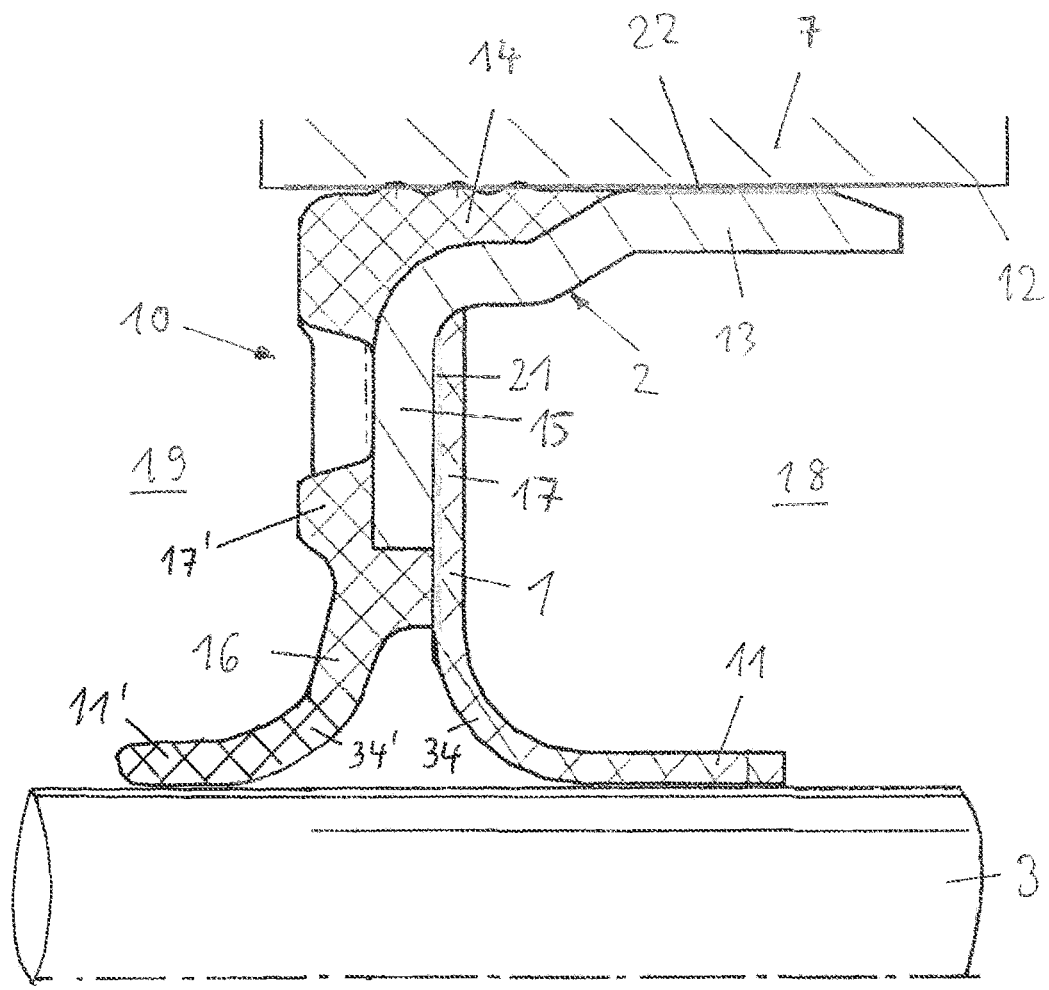

A further advantageous embodiment with an electrically conductive dirt lip or dust protection lip 16 which contacts the shaft 3 is shown in FIG. 11. In this embodiment, the material composition of the dirt lip 16 comprises at least one base material made from a polymer and at least one electrically conductive filler. Regarding the base material and the filler(s) of the dirt lip 16, the statements made above in relation to the base material and the filler(s) of the sealing element 1 apply analogously.

In this embodiment, the dirt lip 16 preferably comprises a contact portion 11' which, analogously to the sealing portion 11 of the sealing element 1, rests over an axial length on the shaft 3 in a contact-making manner, an attachment portion 17' analogous to the attachment portion 17 of the sealing element 1, and a transition portion 34 which is elastically bent between the attachment portion 17' and the contact portion 11', analogously to the transition portion 34 of the sealing element. The attachment portion 17', and thus the dirt lip 16, is electrically conductively connected to the supporting body 2. This can advantageously be executed in the same manner as previously described in relation to the electrically conductive connection between the sealing element 1 and the supporting body 2, in particular by means of vulcanization, with electrically conductive adhesive 21, 39, a contact ring 26, penetrating elements 23, 30, penetrating parts 31, electrically conductive extensions 33 and/or metal rivets 35.

In the previously described embodiment according to FIG. 11, an electrically conductive connection (earth connection) is established between the shaft 3 and the component 7 via the dirt lip 16 and the metal supporting body 2. In this embodiment, the sealing element 1 can also be electrically conductive to improve earthing, or electrically non-conductive if the electrical conductivity of the dirt lip 16 is sufficient.

Figure 12:
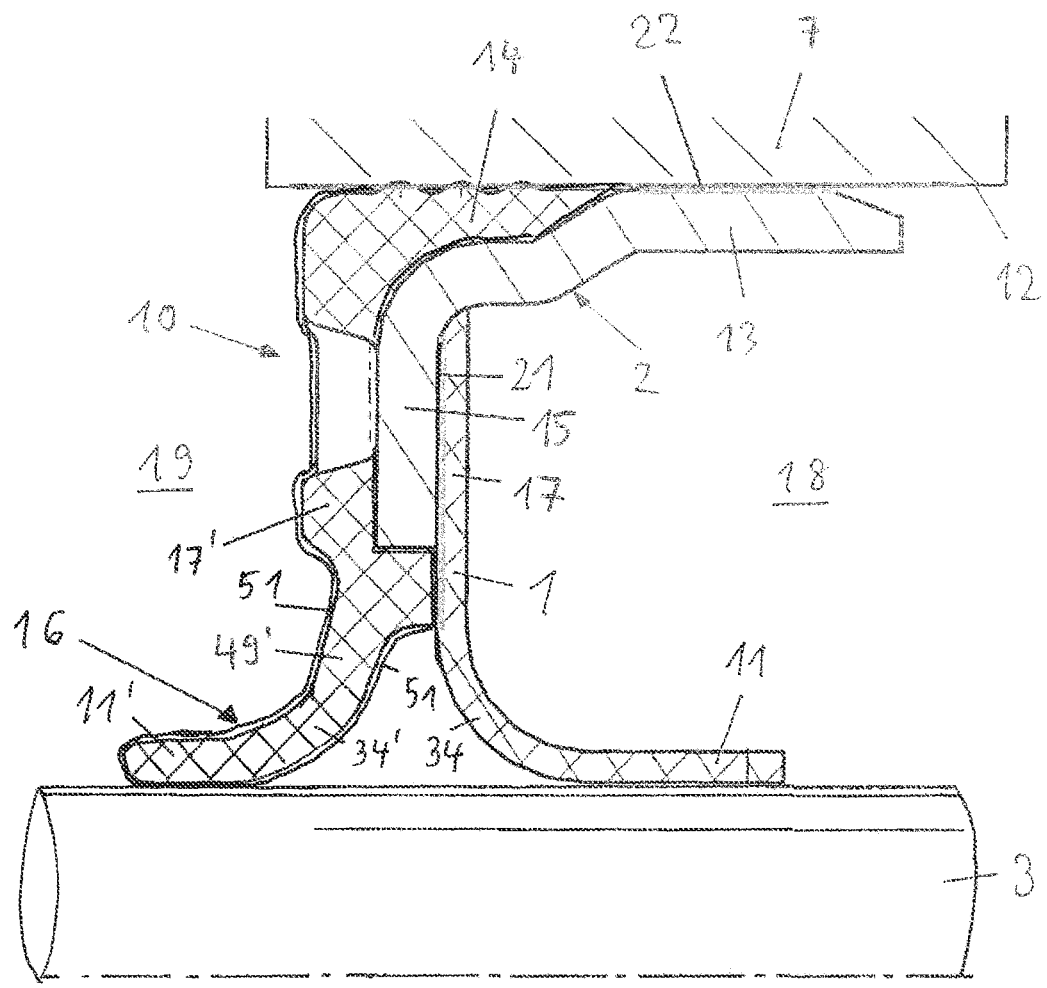

A further embodiment with a contact-making protective lip 16 is shown in FIG. 12. In this embodiment, the dirt lip 16 has an electrically conductive coating 51, to which the statements made regarding the electrically conductive coating 50 of the sealing element 1 apply accordingly. In this case, the main body 49' of the dirt lip 16 is preferably also electrically conductive, such that reliable earthing is still ensured in the event of abrasion of the coating 51.

EMBODIMENTS

Embodiment 1. Radial shaft sealing ring (10), wherein the radial shaft sealing ring (10) is designed to electrically conductively connect a shaft (3) to a component (7) which is stationary relative to the shaft (3), the radial shaft sealing ring (10) having a supporting body (2) and a sealing element (1) attached thereto having a sealing portion (11) which makes contact with the shaft, characterised in that the material composition of the sealing element (1) comprises at least one base material made of at least one polymer and one or more fillers, with at least one electrically conductive filler being provided.

Embodiment 2. Radial shaft sealing ring (10) according to the preamble of embodiment 1, comprising a protective lip (16) which makes contact with the shaft, characterised in that the material composition of the protective lip (16) comprises at least one base material made of at least one polymer and one or more fillers, with at least one electrically conductive filler being provided.

Embodiment 3. Radial shaft sealing ring according to embodiment 1 or 2, characterised in that the electrically conductive filler has metal, metallised and/or metal-coated particles, microspheres, microtubes and/or fibres.

Embodiment 4. Radial shaft sealing ring according to embodiment 3, characterised in that the electrically conductive filler has silver, silver-plated and/or silver-coated particles, microspheres, microtubes and/or fibres.

Embodiment 5. Radial shaft sealing ring (10) according to embodiment 3 or 4, characterised in that the proportion by weight of the electrically conductive filler(s) is in the range between 1% and 25%.

Embodiment 6. Radial shaft sealing ring (10) according to any of the preceding embodiment, characterised in that at least one filler made of electrically conductive carbon is provided.

Embodiment 7. Radial shaft sealing ring (10) according to embodiment 6, characterised in that the proportion by weight of the electrically conductive carbon is in the range between 1% and 15%, preferably in the range between 4% and 10%.

Embodiment 8. Radial shaft sealing ring according to any of the preceding embodiments, characterised in that at least one filler made of fibres, in particular glass fibres, is provided.

Embodiment 9. Radial shaft sealing ring according to embodiment 8, characterised in that the proportion by weight of the at least one fibre filler is in the range between 1% and 20%, preferably in the range between 5% and 15%.

Embodiment 10. Radial shaft sealing ring according to any of the preceding embodiments, characterised in that at least one filler made of a metal oxide or a metal oxide mixture is provided.

Embodiment 11. Radial shaft sealing ring according to embodiment 10, characterised in that at least one filler made of tin oxide and/or indium tin oxide is provided.

Embodiment 12. Radial shaft sealing ring according to embodiment 10 or 11, characterised in that the proportion by weight of the filler(s) containing metal oxide is in the range between 1% and 10%, preferably in the range between 1% and 5%.

Embodiment 13. Radial shaft sealing ring (10) according to any of the preceding embodiments, characterised in that the base material comprises a fluoropolymer such as PTFE, FKM, an elastomer, fluorinated thermoplastic, a PTFE-based polymer or a corresponding copolymer.

Embodiment 14. Radial shaft sealing ring (10) according to any of the preceding embodiments, characterised in that the proportion by weight of the base material is in the range between 50% and 99%.

Embodiment 15. Radial shaft sealing ring according to any of the preceding embodiments, characterised in that at least one filler made of dendritic silver is provided.

Embodiment 16. Radial shaft sealing ring according to embodiment 15, characterised in that the proportion by weight of the filler made of dendritic silver is in the range between 1% and 10%, preferably in the range between 1% and 5%.

Embodiment 17. Radial shaft sealing ring according to any of the preceding embodiments, characterised in that the sealing element (1) and/or the protective lip (16) is attached to the supporting body (2) and/or to the contact ring (26) via an adhesive (21, 39).

Embodiment 18. Radial shaft sealing ring according to any of the preceding embodiments, characterised in that the radial shaft sealing ring (10) comprises an electrically conductive contact ring (26) for making electrical contact with the sealing element (1) and/or the protective lip (16).

Embodiment 19. Radial shaft sealing ring according to embodiment 18, characterised in that the contact ring (26) has at least one electrically conductive penetrating element (23, 30) which penetrates into the sealing element (1) and/or into the protective lip (16) in the installed state.

Embodiment 20. Radial shaft sealing ring according to either embodiment 18 or embodiment 19, characterised in that an electrically conductive contacting element (24) is provided for establishing contact between the contact ring (26) and the component (7).

Embodiment 21. Radial shaft sealing ring according to any of the preceding embodiments, characterised in that the supporting body (2) has at least one electrically conductive, protruding penetrating part (31) which in the installed state penetrates into the sealing element (1) and/or into the protective lip (16).

Embodiment 22. Radial shaft sealing ring according to any of the preceding embodiments, characterised in that the supporting body (2) has, on its inner circumference, at least one electrically conductive extension (33) which, in the installed state, makes contact with the sealing element (1) and/or the protective lip (16), in particular in a transition portion (34) between an attachment portion (17) and a contact portion (11) of the sealing element (1) and/or the protective lip (16).

Embodiment 23. Radial shaft sealing ring according to any of the preceding embodiments, characterised in that the sealing element (1) and/or the protective lip (16) has an electrically conductive surface coating (50, 51) in addition or as an alternative to a preferred electrical conductivity of a corresponding main body (49, 49').

The invention claimed is:

1. A radial shaft sealing ring, comprising:
a supporting body; and
a sealing element attached thereto having a sealing portion which is configured to make contact with a shaft, wherein the sealing element comprises at least one base material made of at least one polymer and one or more fillers, with at least one electrically conductive filler being provided, wherein the radial shaft sealing ring is configured to electrically conductively connect a shaft to a component which is stationary relative to the shaft, wherein the sealing element has an electrically conductive surface coating in addition to an electrically conductive main body of the corresponding sealing element.

2. The radial shaft sealing ring according to claim 1, further comprising a protective lip that is configured to make contact with the shaft, wherein the protective lip comprises a second at least one base material made of a second at least one polymer and a second one or more fillers, with a second at least one electrically conductive filler being provided.

3. The radial shaft sealing ring according to claim 2, further comprising an electrically conductive contact ring for making electrical contact with the sealing element and/or the protective lip, wherein the sealing element and/or the protective lip is attached to the supporting body and/or to the electrically conductive contact ring via an adhesive.

4. The radial shaft sealing ring according to claim 2, wherein the radial shaft sealing ring comprises an electrically conductive contact ring for making electrical contact with the sealing element and/or the protective lip.

5. The radial shaft sealing ring according to claim 4, wherein the electrically conductive contact ring has at least one electrically conductive penetrating element which penetrates into the sealing element and/or into the protective lip in an installed state.

6. The radial shaft sealing ring according to claim 4, wherein an electrically conductive contacting element is provided for establishing contact between the electrically conductive contact ring and the component which is stationary relative to the shaft.

7. The radial shaft sealing ring according to claim 2, wherein the supporting body has at least one electrically conductive, protruding penetrating part which in an installed state penetrates into the sealing element and/or into the protective lip.

8. The radial shaft sealing ring according to claim 2, wherein the supporting body has, on an inner circumference of the supporting body, at least one electrically conductive extension that, in an installed state, makes contact with the sealing element and/or the protective lip.

9. The radial shaft sealing ring according to claim 2, wherein the protective lip has a second electrically conductive surface coating in addition to a second electrically conductive main body of the corresponding protective lip.

10. The radial shaft sealing ring according to claim 1, wherein the at least one electrically conductive filler has metal, metallised and/or metal-coated particles, microspheres, microtubes, and/or fibres.

11. The radial shaft sealing ring according to claim 10, wherein a proportion by weight of the at least one electrically conductive filler is in a range between 1% and 25%.

12. The radial shaft sealing ring according to claim 1, wherein the at least one electrically conductive filler has silver, silver-plated and/or silver-coated particles, microspheres, microtubes, and/or fibres.

13. The radial shaft sealing ring according to claim 1, wherein the at least one electrically conductive filler comprises an electrically conductive filler made of electrically conductive carbon.

14. The radial shaft sealing ring according to claim 13, wherein a proportion by weight of the electrically conductive carbon is in a range between 1% and 15%.

15. The radial shaft sealing ring according to claim 1, wherein the one or more fillers comprises at least one filler made of fibres.

16. The radial shaft sealing ring according to claim 15, wherein a proportion by weight of the at least one filler made of fibres is in the range between 1% and 20%.

17. The radial shaft sealing ring according to claim 1, wherein the one or more fillers comprises at least one filler made of a metal oxide or a metal oxide mixture.

18. The radial shaft sealing ring according to claim 17, wherein a proportion by weight of the at least one made of filler metal oxide is in a range between 1% and 10%.

19. The radial shaft sealing ring according to claim 1, wherein the one or more fillers comprises at least one filler made of tin oxide and/or indium tin oxide.

20. The radial shaft sealing ring according to claim 1, wherein the at least one base material comprises a fluoropolymer, PTFE, FKM, an elastomer, fluorinated thermoplastic, and/or a PTFE-based polymer or a corresponding copolymer.

21. The radial shaft sealing ring according to claim 1, wherein a proportion by weight of the at least one base material is in a range between 50% and 99%.

22. The radial shaft sealing ring according to claim 1, wherein the one or more fillers comprises at least one filler made of dendritic silver.

23. The radial shaft sealing ring according to claim 22, wherein a proportion by weight of the at least one filler made of dendritic silver is in a range between 1% and 10%.

* * * * *